United States Patent
Choi

(10) Patent No.: US 11,180,183 B2
(45) Date of Patent: Nov. 23, 2021

(54) STEER-BY-WIRE APPARATUS

(71) Applicant: HYUNDAI MOBIS CO., LTD., Seoul (KR)

(72) Inventor: Won Hyok Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 191 days.

(21) Appl. No.: 16/517,013

(22) Filed: Jul. 19, 2019

(65) Prior Publication Data

US 2020/0023885 A1 Jan. 23, 2020

(30) Foreign Application Priority Data

Jul. 20, 2018 (KR) ........................ 10-2018-0084569

(51) Int. Cl.
*B62D 5/00* (2006.01)
*B62D 5/04* (2006.01)
*B62D 3/12* (2006.01)
*B62D 15/02* (2006.01)

(52) U.S. Cl.
CPC ............ *B62D 5/003* (2013.01); *B62D 5/043* (2013.01); *B62D 5/0457* (2013.01); *B62D 3/12* (2013.01); *B62D 5/001* (2013.01); *B62D 5/0445* (2013.01); *B62D 15/0225* (2013.01)

(58) Field of Classification Search
CPC ..... B62D 5/003; B62D 5/0433; B62D 5/0436
See application file for complete search history.

(56) References Cited

U.S. PATENT DOCUMENTS

| | | | | |
|---|---|---|---|---|
| 7,174,987 B2* | 2/2007 | Husain | .................. | B62D 5/003 180/402 |
| 9,096,254 B2* | 8/2015 | Sekiya | .................. | B62D 5/043 |
| 9,555,826 B2* | 1/2017 | Lee | ........................ | B62D 5/003 |
| 9,573,617 B2* | 2/2017 | Shibuya | ................ | B60W 10/20 |
| 9,688,301 B2* | 6/2017 | Shibuya | ................ | F02D 29/02 |
| 2020/0391790 A1* | 12/2020 | Kamemura | .......... | B62D 5/0463 |
| 2021/0046972 A1* | 2/2021 | Fujita | .................. | B62D 5/0463 |

FOREIGN PATENT DOCUMENTS

| | | | |
|---|---|---|---|
| CN | 103085857 A | | 5/2013 |
| CN | 104995078 A | | 10/2015 |
| CN | 106043413 A | | 10/2016 |
| CN | 107444480 A | | 12/2017 |
| CN | 212125282 U | * | 12/2020 |
| KR | 10-1189627 B1 | | 10/2012 |

OTHER PUBLICATIONS

Office Action dated Jul. 2, 2021 in corresponding Chinese Application No. 201910646577.2.

* cited by examiner

*Primary Examiner* — Kevin Hurley
(74) *Attorney, Agent, or Firm* — NovoTechIP International PLLC

(57) ABSTRACT

A steer-by-wire apparatus may include: a first rotating part rotated with a steering wheel; a second rotating part installed so as to be isolated from the first rotating part, and engaged with a first rack gear provided on a side surface of a gear bar; a sensor installed on each of the first and second rotating parts, and configured to measure at least any one of a rotation angle of the first rotating part, a rotation angle of the second rotating part and a torque value of the first rotating part; a controller configured to receive the measured value of the sensor; and a clutch configured to operate according to a control signal of the controller and synchronize rotations of the first and second rotating parts.

8 Claims, 12 Drawing Sheets

STEER-BY-WIRE APPARATUS

CROSS-REFERENCES TO RELATED APPLICATIONS

The present application claims priority to Korean application number 10-2018-0084569, filed on Jul. 20, 2018, which is incorporated by reference in its entirety.

BACKGROUND OF THE INVENTION

The present invention relates to a steer-by-wire apparatus, and more particularly, to a steer-by-wire apparatus with an enhanced fail safe function.

As a power steering apparatus of a vehicle, which is generally called a power steering wheel, a hydraulic power steering apparatus using hydraulic pressure of a hydraulic pump has been commonly used. Recently, however, the use of an electric power steering apparatus (EPS) using an electric motor has increased.

In the existing hydraulic power steering apparatus, a hydraulic pump serving as a power source for supplying power is driven by an engine, and always consumes energy regardless of whether a steering wheel is rotated. However, the EPS senses torque generated by rotation of the steering wheel, and drives the motor according to the torque. Thus, the EPS uses the rotational force of the motor as steering power. Therefore, when the EPS is used, the energy efficiency of the vehicle can be improved further than when the hydraulic power steering apparatus is used.

A steer-by-wire apparatus, which is one type of the EPS, steers a steering system only with electric power without mechanical connection.

The conventional steer-by-wire apparatus is not physically connected to a steering gear box at the bottom thereof. Thus, when a system abnormality occurs, the steer-by-wire apparatus cannot control the vehicle, thereby raising the risk of accident. Therefore, there is a demand for a structure capable of solving the problem.

The related art is disclosed in Korean Patent No. 10-1189627 registered on Oct. 4, 2012 and entitled "Steer-By-Wire Steering Apparatus".

SUMMARY OF THE INVENTION

Embodiments of the present invention are directed to a steer-by-wire apparatus with an enhanced fail safe function.

In one embodiment, a steer-by-wire apparatus may include: a first rotating part rotated with a steering wheel; a second rotating part installed so as to be isolated from the first rotating part, and engaged with a first rack gear provided on a side surface of a gear bar; a sensor installed on each of the first and second rotating parts, and configured to measure at least any one of a rotation angle of the first rotating part, a rotation angle of the second rotating part and a torque value of the first rotating part; a controller configured to receive the measured value of the sensor; and a clutch configured to operate according to a control signal of the controller and synchronize rotations of the first and second rotating parts.

The steer-by-wire apparatus may further include: a first driver connected to the first rotating part, and configured to operate according to the control signal of the controller and rotate the first rotating part or provide a steering reaction force; and a second driver connected to the gear bar, and configured to operate according to the control signal of the controller and move the gear bar.

The first driver may include: a first worm wheel gear fixed to the outer circumference of the first rotating part, and rotated with the first rotating part; and a first motor having an output shaft engaged with the first worm wheel gear, and configured to operate according to the control signal of the controller.

The second driver may include: a rotating nut engaged with a screw gear provided on the outside of the gear bar; a second motor configured to operate according to the control signal of the controller; and a belt member connecting an output shaft of the second motor to the rotating nut.

The second driver may include: a driving pinion gear engaged and rotated with a second rack gear provided on the outside of the gear bar; a second worm wheel gear fixed to the outer circumference of the driving pinion gear, and rotated with the driving pinion gear; and a second motor having an output shaft engaged with the second worm wheel gear, and configured to operate according to the control signal of the controller.

The steer-by-wire apparatus may further include a rotation sensing part installed at a position facing the driving pinion gear, and configured to measure a rotation angle of the driving pinion gear and transfer the measured value to the controller.

The sensor may include: a first sensor configured to measure at least any one of the rotation angle and the torque value of the first rotating part, and transfer the measured value to the controller; and a second sensor configured to measure the rotation angle of the second rotating part, and transfer the measured value to the controller.

The first sensor may include: a torsion bar having both sides connected to a first member and a second member of the first rotating part, with the first rotating part separated into the first and second members; and a measurement member installed in a shape to cover the outsides of the first and second members, and configured to measure a torque value of the torsion bar and rotation angles of the first and second members.

When the measurement member does not measure a torque value, the controller may operate the clutch to synchronize the rotations of the first and second rotating parts, calculate a torque value using the rotation angles measured by the measurement member and the second sensor, respectively, and a previously inputted torque constant of the torsion bar, and control the operation of the second driver.

The clutch may include: a first clutch connected to the first rotating part; and a second clutch connected to the second rotating part and installed at a position facing the first clutch.

In accordance with the embodiment of the present invention, even when the function of the first sensor to sense a torque value fails, the controller may calculate the torque value using the rotation angles measured by the first and second sensors and the previously inputted torque constant of the torsion bar, and then operate the second driver, thereby improving the fail safe function.

Furthermore, when the second driver to move the gear bar fails, the clutch may synchronize the rotations of the first and second rotating parts and switch the steer-by-wire apparatus to the MDPS mode to move the gear bar, thereby improving the fail safe function.

DESCRIPTION OF SPECIFIC EMBODIMENTS

Hereafter, a steer-by-wire apparatus in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
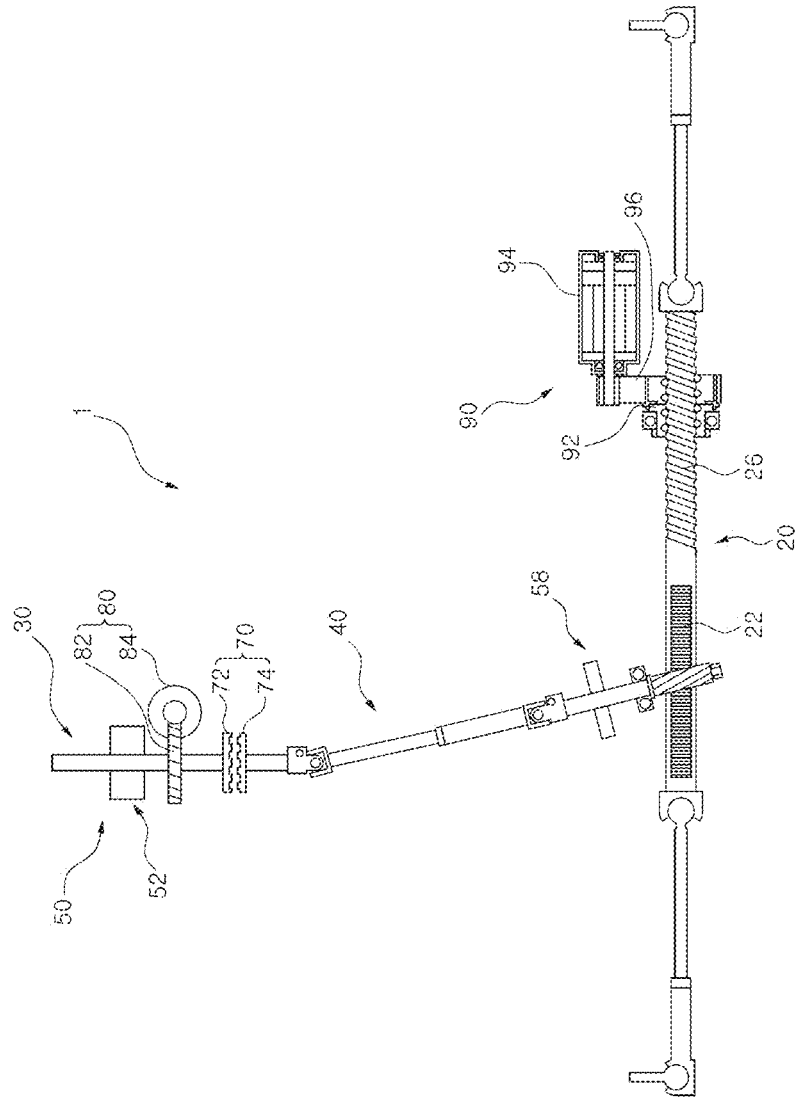
FIG. 1 is a diagram schematically illustrating a structure of a steer-by-wire apparatus in accordance with an embodiment of the present invention.
Figure 2:
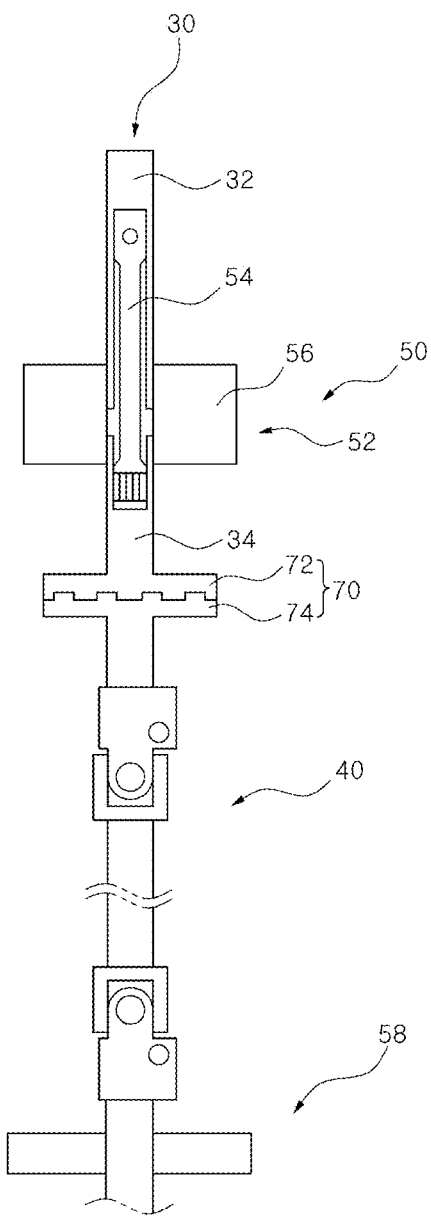
FIG. 2 is a diagram illustrating that a first sensor is installed in a first rotating part in accordance with the embodiment of the present invention.
Figure 3:
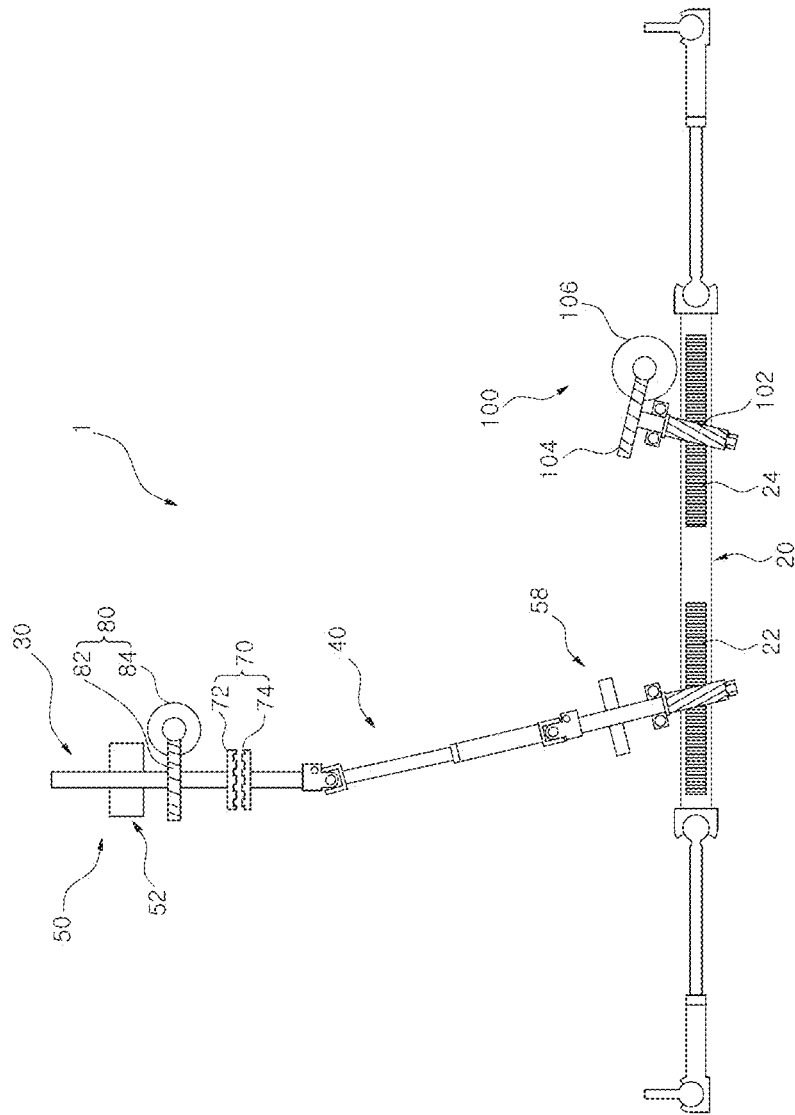
FIG. 3 is a diagram illustrating another example of a second driver in accordance with the embodiment of the present invention.
Figure 4:
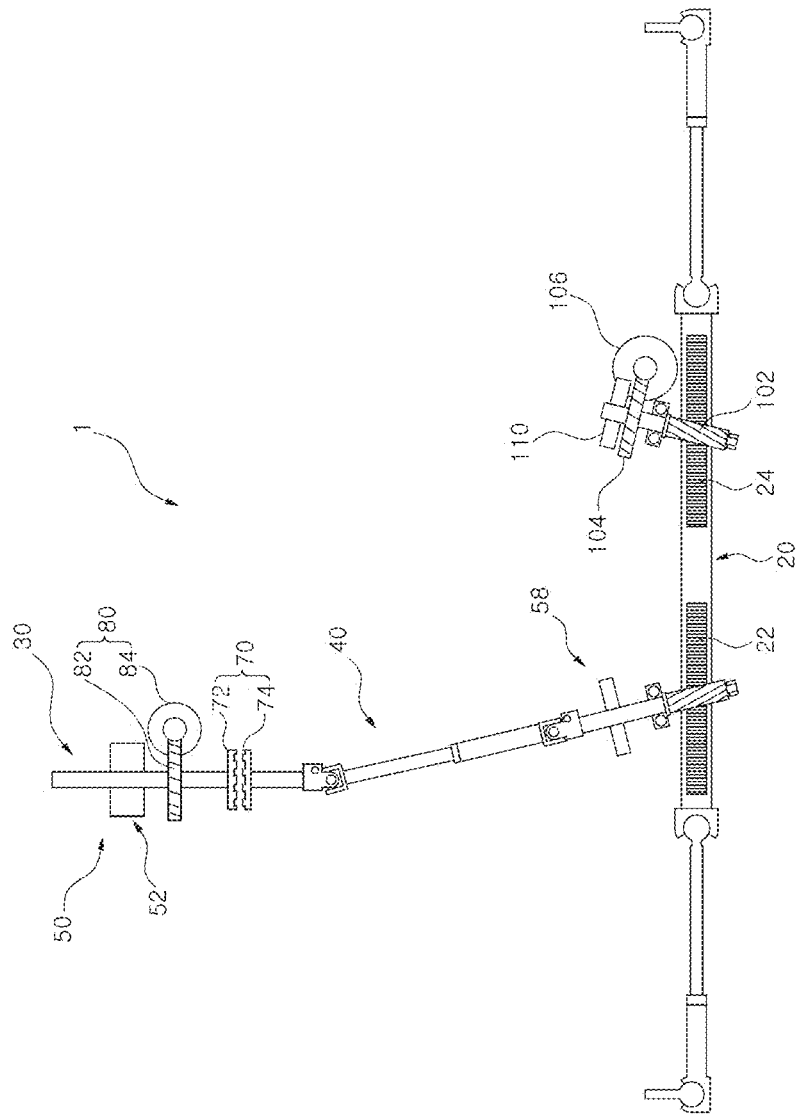
FIG. 4 is a diagram illustrating an installation state of a rotation sensing part in accordance with the embodiment of the present invention.
Figure 5:
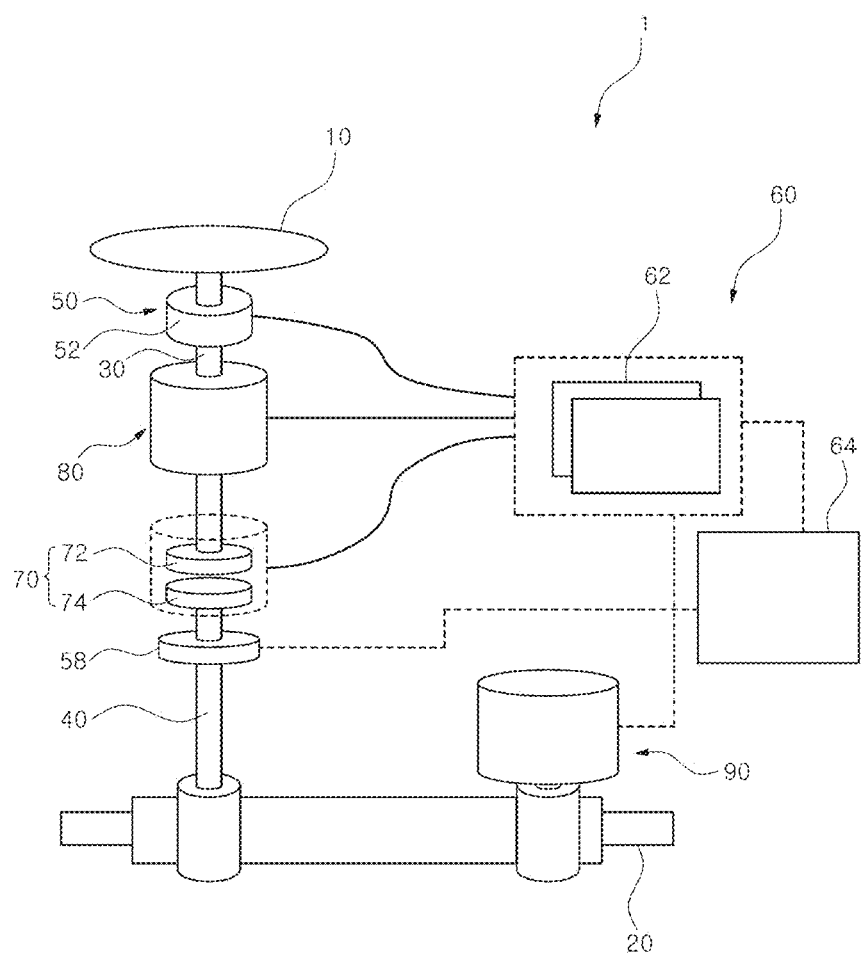
FIGS. 5 and 6 are schematic views of the steer-by-wire apparatus in accordance with the embodiment of the present invention.
Figure 6:
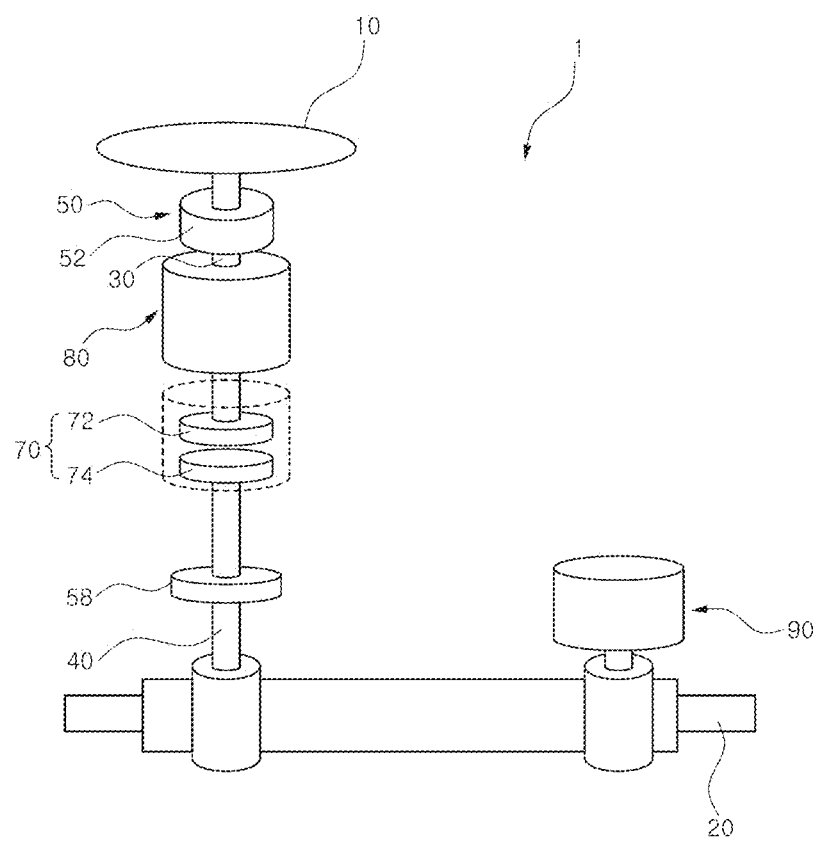

FIG. 1 is a diagram schematically illustrating a structure of a steer-by-wire apparatus in accordance with an embodiment of the present invention, FIG. 2 is a diagram illustrating that a first sensor is installed in a first rotating part in accordance with the embodiment of the present invention, FIG. 3 is a diagram illustrating another example of a second driver in accordance with the embodiment of the present invention, FIG. 4 is a diagram illustrating an installation state of a rotation sensing part in accordance with the embodiment of the present invention, and FIGS. 5 and 6 are schematic views of the steer-by-wire apparatus in accordance with the embodiment of the present invention.

As illustrated in FIGS. 1 and 5, the steer-by-wire apparatus 1 in accordance with the embodiment of the present invention may include a first rotating part 30, a second rotating part 40, a sensor 50, a controller 60 and a clutch 70. The first rotating part 30 may be rotated with a steering wheel 10, the second rotating part 40 may be installed so as to be isolated from the first rotating part 30 and engaged with a first rack gear 22 provided on a side surface of a gear bar 20, the sensor 50 may be installed on each of the first and second rotating parts 30 and 40 and measure at least any one of a rotation angle of the first rotating part 30, a rotation angle of the second rotating part 40, and torque of the first rotating part 30, the controller 60 may receive the measured value of the sensor 50, and the clutch 70 may be operated according to a control signal of the controller 60 and synchronize the rotations of the first and second rotating parts 30 and 40.

The steering wheel 10 rotated by a driver's operation may be connected to the first rotating part 30. Therefore, the first rotating part 30 may be rotated with the steering wheel 10. The steering wheel 10 may be connected to the top of the first rotating part 30, and the first rotating part 30 may be rotated by the rotation of the steering wheel 10.

As illustrated in FIG. 2, the first rotating part 30 may include a first member 32 and a second member 34. The first and second members 32 and 34 may be installed so as to be isolated from each other, one side of a torsion bar 54 may be connected to the inside of the first member 32, and the other side of the torsion bar 54 may be connected to the inside of the second member 34.

As illustrated in FIGS. 1 and 2, the second rotating part 40 may be installed so as to be isolated from the first rotating part 30, and rotatably engaged with the first rack gear 22 provided on the side surface of the gear bar 20. The second rotating part 40 may be formed in a single-bar shape, and have a multi-joint structure which can be rotated at a plurality of points.

The gear bar 20 geared with the second rotating part 40 may be engaged with the second rotating part 40 and linearly moved by an operation of a second driver 90. The gear bar 20 may be formed in a rod shape, and the first rack gear 22 may be formed on the side surface of the gear bar 20, facing the second rotating part 40. The second rotating part 40 engaged with the first rack gear 22 may have a pinion gear formed on the outside thereof, and the second rotating part 40 and the first rack gear 22 may be engaged with each other. Therefore, when the second rotating part 40 is rotated, the first rack gear 22 connected through the rack pinion gear may be moved in a side-to-side direction.

The gear bar 20 connected to the second driver 90 may have a screw gear 26 provided at the other side thereof. The gear bar 20 may be installed in a separate housing such that rotation thereof is constrained. When a rotating nut 92 of the second driver 90 geared with the screw gear 26 of the gear bar 20 is rotated, the gear bar 20 may rotate a wheel while moved linearly in the side-to-side direction.

As illustrated in FIGS. 1, 2, 5 and 6, the sensor 50 may be installed on each of the first and second rotating parts 30 and 40, and various types of sensors may be used as the sensor 50, as long as the sensors can measure at least any one of the rotation angle of the first rotating part 30, the rotation angle of the second rotating part 40 and the torque value of the first rotating part 30. The sensor 50 in accordance with the embodiment of the present invention may include a first sensor 52 and a second sensor 58. The first sensor 52 may measure the rotation angle and torque value of the first rotating part 30 and transfer the measured values to the controller 60, and the second sensor 58 may measure the rotation angle of the second rotating part 40 and transfer the measured value to the controller 60.

The first sensor 52 may be installed on the first rotating part 30, and measure at least any one of the torque value and the rotation angle of the first rotating part 30 rotated with the steering wheel 10. The first sensor 52 in accordance with the present embodiment may include the torsion bar 54 and a measurement member 56.

The torsion bar 54 may be formed of a material having a preset torque constant and have a rod shape, and both sides of the torsion bar 54 may be connected to the first and second members 32 and 34, respectively, with the first rotating part 30 separated into the first and second members 32 and 34.

The measurement member 56 may be installed in a shape to cover the outsides of the first and second members 32 and 34, measure the torque value of the torsion bar 54 and the rotation angles of the first and second members 32 and 34, and transfer the measured values to the controller 60. The measurement member 56 may be installed in a shape to cover the outsides of ends of the first and second members 32 and 34 facing each other.

The controller 60 may receive the measured values of the sensor 50, and control the operations of a first driver 80, the second driver 90 and the clutch 70. The controller 60 in accordance with the embodiment of the present invention may include a main controller 62 and a sub controller 64.

The main controller 62 may be connected to the first sensor 52, the first driver 80, the second driver 90 and the clutch 70, and the sub controller 64 may be connected to the main controller 62 and the second sensor 58.

When the measurement member 56 of the first sensor 52 does not measure a torque value, the controller 60 may operate the clutch 70 to synchronize the rotations of the first and second rotating parts 30 and 40, and calculate a torque value by using the rotation angles measured by the measurement member 56 and the second sensor 58, respectively, and a previously inputted torque constant of the torsion bar 54, thereby controlling the operation of the second driver 90.

As the clutch 70, various types of clutches may be used as long as the clutches are operated according to the control signal of the controller 60 and synchronize the rotations of the first and second rotating parts 30 and 40. The clutch 70 in accordance with the embodiment of the present invention may include a first clutch 72 connected to the bottom of the first rotating part 30 and a second clutch 74 connected to the top of the second rotating part 40 and installed at a position facing the first clutch 72. According to the control signal of the controller 60, the first and second clutches 72 and 74 may be coupled to synchronize the rotations, or separated from each other to block the rotation of the first rotating part 30 from being transferred to the second rotating part 40.

The first driver 80 may be formed in various shapes, as long as the first driver 80 is connected to the first rotating part 30, operated according to the control signal of the controller 60, and rotates the first rotating part 30 or provides a steering reaction force. The first driver 80 in accordance with the embodiment of the present invention may include a first worm wheel gear 82 fixed to the outer circumference of the first rotating part 30 and rotated with the first rotating part 30 and a first motor 84 having an output shaft engaged with the first worm wheel gear 82 and operated according to the control signal of the controller 60.

The first worm wheel gear 82 may be formed on the circumference of the first rotating part 30, and the output shaft of the first motor 84 engaged with the first worm wheel gear 82 may have a worm gear formed thereon. Therefore, the first worm wheel gear 82 may rotate the first rotating part 30 while rotated by the operation of the first motor 84. The first driver 80 constituted by the first worm wheel gear 82 and the first motor 84 may transfer a steering reaction feel to a driver.

As illustrated in FIG. 1, the second driver 90 may be connected to the gear bar 20, operated according to the control signal of the controller 60, and move the gear bar 20. The second driver 90 in accordance with the embodiment of the present invention may include the rotating nut 92 engaged with the screw gear 26 provided on the outside of the gear bar 20, a second motor 94 operated according to the control signal of the controller 60, and a belt member 96 connecting an output shaft of the second motor 94 to the rotating nut 92.

The gear bar 20 may be installed in a separate housing such that the rotation thereof is constrained, and allowed to move only in the side-to-side direction. The second motor 94 installed outside the housing may be operated by the control signal of the controller 60, and supply rotation power.

Since the output shaft of the second motor 94 is connected to the rotating nut 92 engaged with the screw gear 26 through the belt member 96, the rotating nut 92 may be rotated by an operation of the second motor 94, and move the gear bar 20 in the side-to-side direction.

FIGS. 3 and 4 illustrate another embodiment of a second driver 100. As illustrated in FIGS. 3 and 4, the second driver 100 may include a driving pinion gear 102, a second worm wheel gear 104 and a second motor 106.

The driving pinion gear 102 may be rotatably installed as a rod-shaped gear which is engaged and rotated with a second rack gear 24 provided outside the gear bar 20. The second worm wheel gear 104 may be fixed to the outer circumference of the driving pinion gear 102, and rotated with the driving pinion gear 102. The second worm wheel gear 104 may be formed in a disk shape, and have a gear formed on the circumference thereof. The second motor 106 may have an output shaft engaged with the second worm wheel gear 104, and operate according to the control signal of the controller 60.

The second worm wheel gear 104 may have a worm wheel gear formed on the circumference thereof, and the output shaft of the second motor 106, which is engaged with the worm wheel gear, may have a worm gear formed thereon. Therefore, the second worm wheel gear 104 may move the gear bar 20 while rotated by the operation of the second motor 106.

The steer-by-wire apparatus 1 may further include a rotation sensing part 110. The rotation sensing part 110 may be installed at a position facing the driving pinion gear 102, measure rotation of the driving pinion gear 102, and transfer the measured value to the controller 60. The rotation sensing part 110 in accordance with the embodiment of the present invention may be installed in a ring shape to surround the circumference of the driving pinion gear 102, and measure the rotation of the driving pinion gear 102.

Since the second sensor 58 measures the rotation angle of the second rotating part 40 and the rotation sensing part 110 measures the rotation angle of the driving pinion gear 102 and transfers the measured value to the controller 60, the fail safe function may be further reinforced.

Hereafter, the operation state of the steer-by-wire apparatus 1 in accordance with the embodiment of the present invention will be described in detail with reference to the accompanying drawings.

As illustrated in FIGS. 1, 5 and 6, when the first rotating part 30 is rotated by the rotation of the steering wheel 10, the first sensor 52 may measure a torque value and rotation angle transferred through the first rotating part 30, and transfer the measured values to the controller 60.

The controller 60 may operate the first driver 80 to transfer a steering reaction feel to a driver. Since the controller 60 operates the second driver 90 to move the gear bar 20 in the side-to-side direction, the direction of the wheel may be adjusted. At this time, since the first and second clutches 72 and 74 are separated from each other, power for rotating the first rotating part 30 may not be transferred to the second rotating part 40.

The second motor 94 used in the second driver 90 may be configured in a dual stator type or dual winding type to secure system stability.

Since the steer-by-wire apparatus 1 includes the clutch 70, the steer-by-wire apparatus 1 may release the clutch 70 when the system normally operates, and connect the clutch 70 to operate in an MDPS mode, when a system abnormality occurs.

The steer-by-wire apparatus 1 may be operated in a normal mode, an emergency steering mode and a manual mode.

In the normal mode, the first driver 80 serving as a reaction apparatus may generate a steering reaction feel for a driver, when the steering wheel 10 is handled. The controller 60 may operate the second driver 90 using the values measured by the first sensor 52, and thus move the gear bar 20.

In the emergency steering mode, the steer-by-wire apparatus 1 may connect the clutch 70 to synchronize the rotations of the first and second rotating parts 30 and 40 for control, when the steer-by-wire apparatus 1 cannot be operated in the normal mode due to a system abnormality. When the steer-by-wire apparatus 1 can connect the clutch 70 and use a torque sensor value, the steer-by-wire apparatus 1 may operate the first and second drivers 80 and 90 to perform control in the MDPS mode.

The MDPS may refer to a motor driven power steering system of a vehicle, which facilitates steering by providing a part of steering torque, which needs to be applied to the steering wheel 10 by a driver when the vehicle is steered, using an auxiliary power source.

The manual mode may indicate an emergency mode in which the first and second rotating parts 30 and 40 are connected through the clutch 70 and steering is performed only by a driver's force, in case of a system failure or battery discharge in which even the emergency steering mode cannot be performed.

Figure 7:
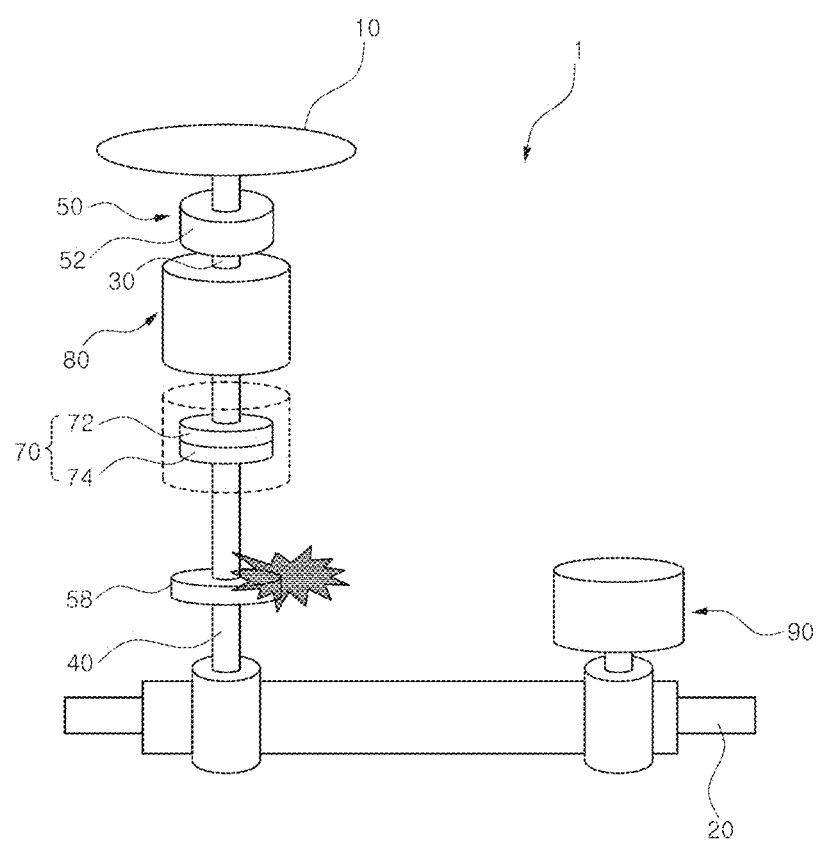
FIG. 7 is a diagram illustrating that a clutch is operated in a state where a second sensor fails in accordance with the embodiment of the present invention.
Figure 8:
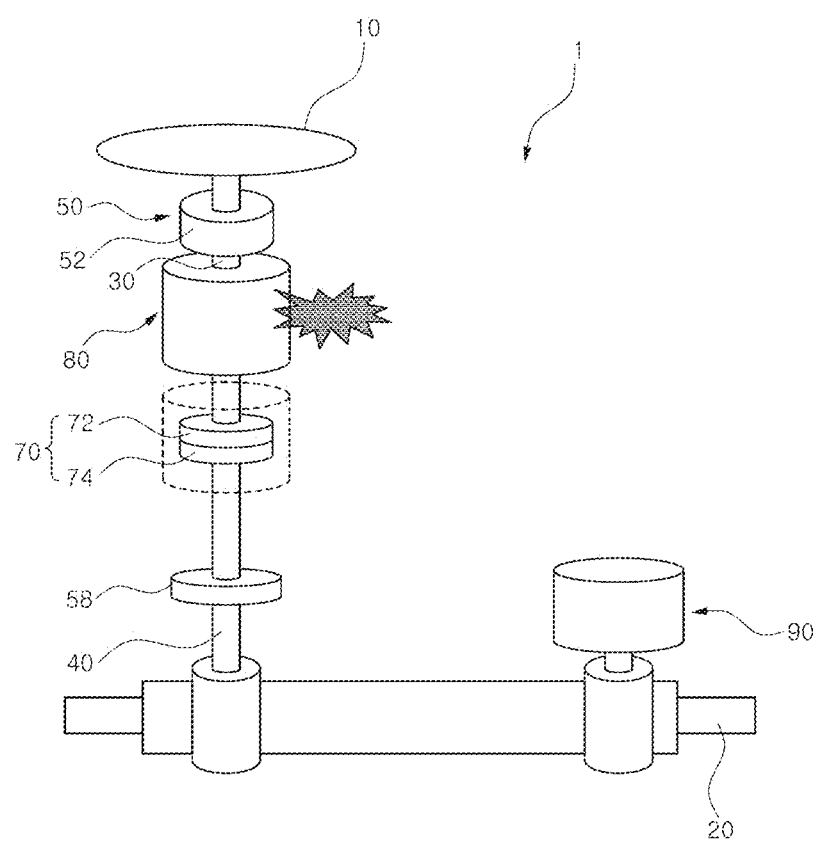
FIG. 8 is a diagram illustrating that the clutch is operated in a state where a first driver fails in accordance with the embodiment of the present invention.
Figure 9:
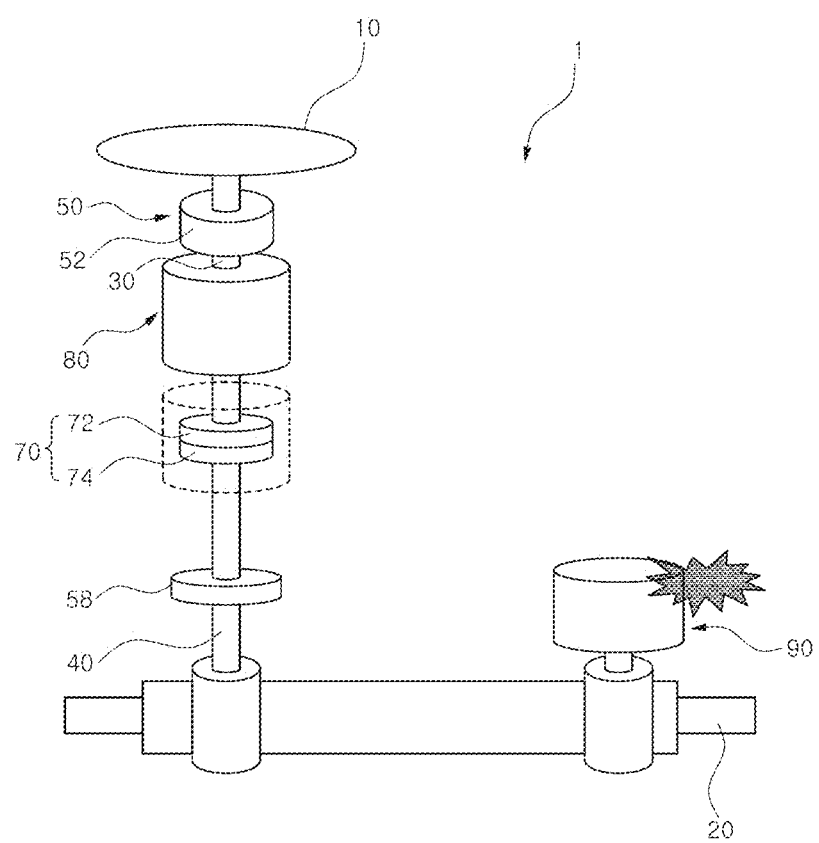
FIG. 9 is a diagram illustrating that the clutch is operated in a state where the second driver fails in accordance with the embodiment of the present invention.
Figure 10:
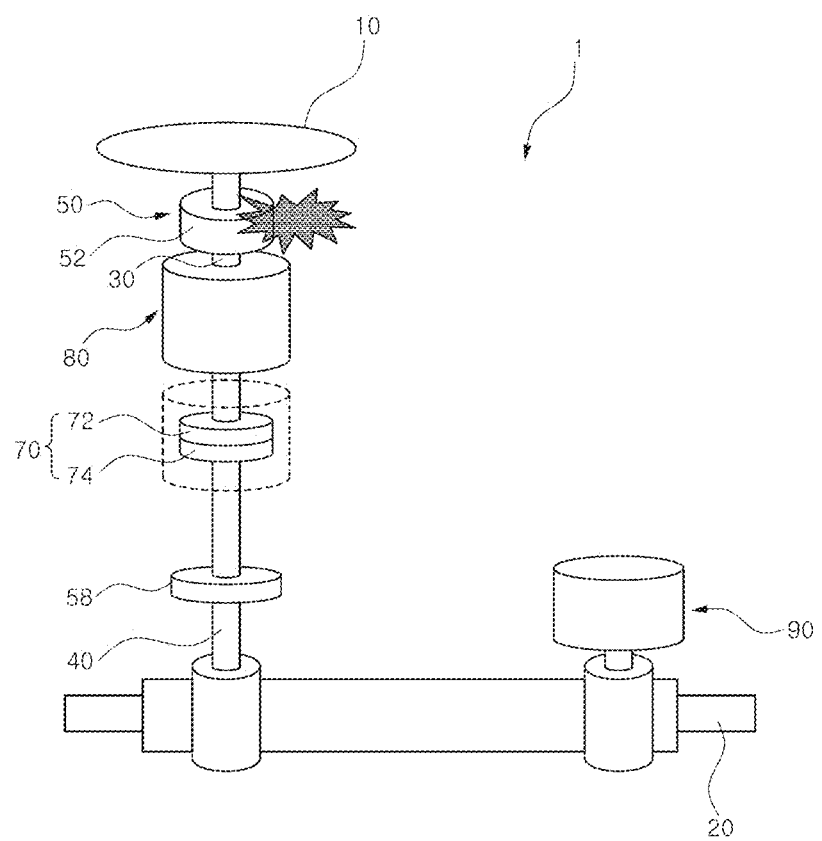
FIG. 10 is a diagram illustrating that the clutch is operated in a state where a rotation angle and torque value of the first driver cannot be measured in accordance with the embodiment of the present invention.
Figure 11:
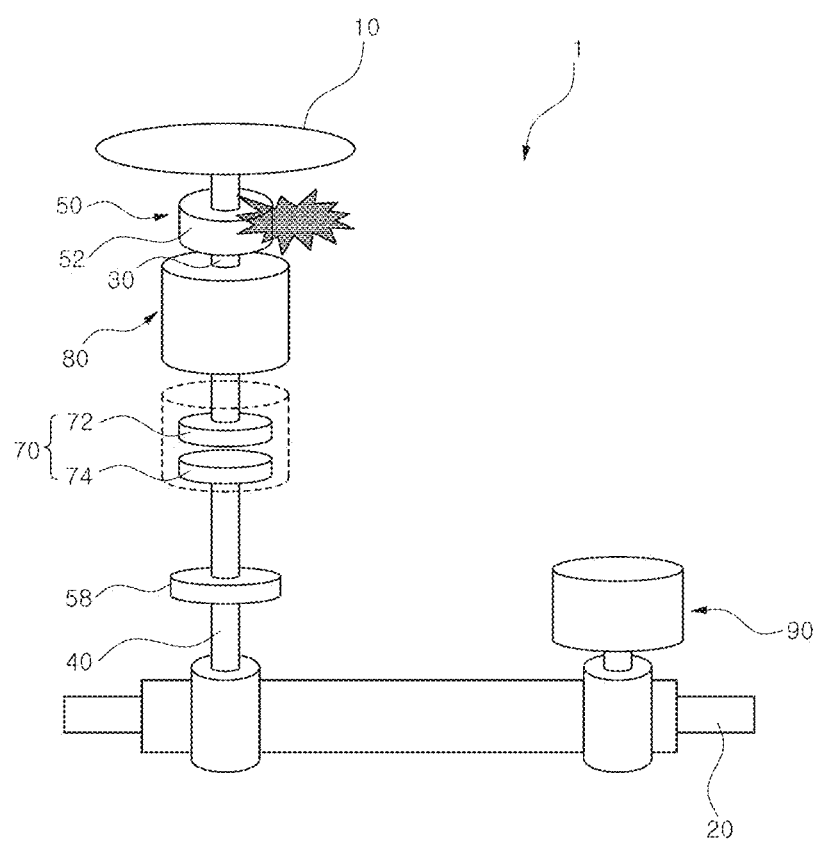
FIG. 11 is a diagram illustrating that the clutch is operated in a state where the torque value of the first driver cannot be measured in accordance with the embodiment of the present invention.
Figure 12:
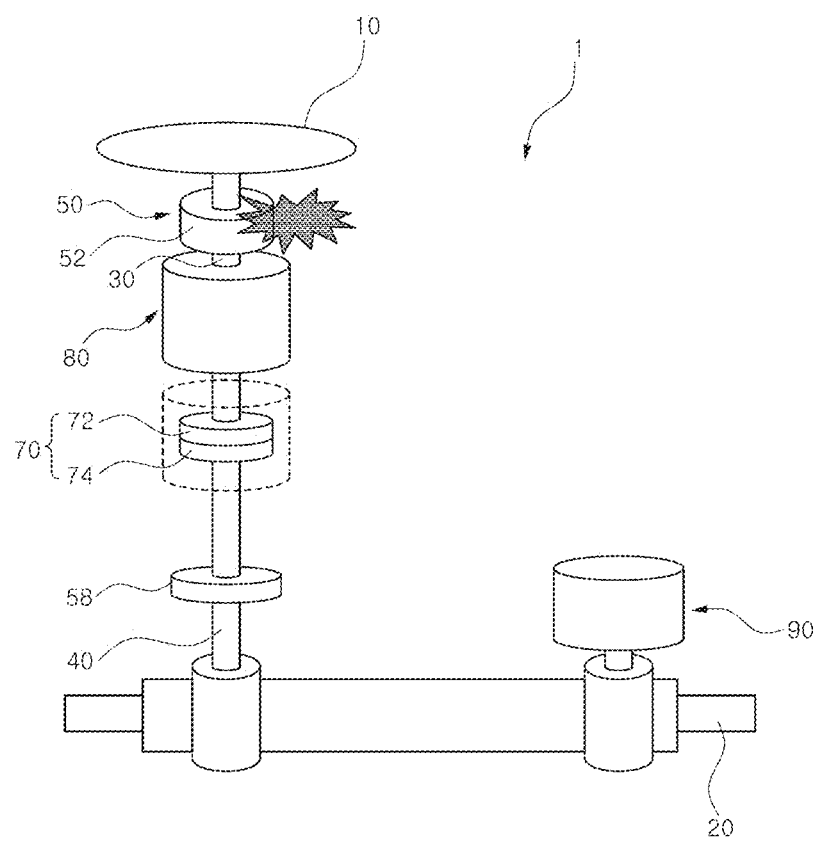
FIG. 12 is a diagram illustrating that the clutch is operated in a state where the rotation angle of the first driver cannot be measured in accordance with the embodiment of the present invention.

FIG. 7 is a diagram illustrating that the clutch is operated in a state where the second sensor fails in accordance with the embodiment of the present invention, FIG. 8 is a diagram illustrating that the clutch is operated in a state where the first driver fails in accordance with the embodiment of the present invention, FIG. 9 is a diagram illustrating that the clutch is operated in a state where the second driver fails in accordance with the embodiment of the present invention, FIG. 10 is a diagram illustrating that the clutch is operated in a state where the rotation angle and torque value of the first driver cannot be measured in accordance with the embodiment of the present invention, FIG. 11 is a diagram illustrating that the clutch is operated in a state where the torque value of the first driver cannot be measured in accordance with the embodiment of the present invention, and FIG. 12 is a diagram illustrating that the clutch is operated in a state where the rotation angle of the first driver cannot be measured in accordance with the embodiment of the present invention.

When the second sensor 58 fails as illustrated in FIG. 7, the steer-by-wire apparatus 1 cannot be controlled, and thus the system may be switched to the emergency steering mode. Therefore, the clutch 70 may synchronize the rotations of the first and second rotating parts 30 and 40, and switch the steer-by-wire apparatus 1 to the MDPS mode to perform steering in case of emergency. The controller 60 may receive the measured value of the first sensor 52, and operate the first driver 80 and the second driver 90 to operate the steer-by-wire apparatus 1 in the MDPS mode.

When the first driver 80 fails as illustrated in FIG. 8, a reaction force cannot be generated through the first driver 80, and thus the system may be switched to the emergency steering mode. Therefore, the clutch 70 may synchronize the rotations of the first and second rotating parts 30 and 40, and switch the steer-by-wire apparatus 1 to the MDPS mode to perform steering in case of emergency. At this time, since the first sensor 52 is used as a sensor and the gear bar 20 is moved by the second driver 90, the steer-by-wire apparatus 1 may be operated in the MDPS mode.

When the second driver 90 fails as illustrated in FIG. 9, the wheels of the vehicle cannot be steered, and thus the system may be switched to the emergency steering mode. Therefore, the clutch 70 may synchronize the rotations of the first and second rotating parts 30 and 40, and switch the steer-by-wire apparatus 1 to the MDPS mode to perform steering in case of emergency.

Since the first sensor 52 is used as a sensor and the first rotating part 30 is rotated by the first driver 80, the steer-by-wire apparatus 1 may be operated in the MDPS mode to move the gear bar 20.

When only the first driver 80 is operated, an output may be slightly insufficient. However, since a large steering output is not required during driving, the output can be sufficiently used for emergency steering.

When the first sensor 52 for measuring a rotation angle and a torque value fails as illustrated in FIG. 10, a driver's steering angle and steering torque cannot be measured, and thus the system may be switched to the manual mode. Even in case of system down or engine-off due to a low voltage of the vehicle, the system may also be switched to the manual mode.

When the measurement member 56 of the first sensor 52 cannot measure a torque value as illustrated in FIGS. 1, 2 and 11, a torque signal may be required in the case that the steer-by-wire apparatus 1 is urgently switched to the MDPS mode. Therefore, the controller 60 may first operate the clutch 70 to connect the first rotating part 30 serving as the input shaft to the second rotating part 40 serving as the output shaft, thereby synchronizing the rotations of the first and second rotating parts 30 and 40.

While no handling is performed, the rotation angle of the first rotating part 30 and the rotation angle of the second rotating part 40 may be equal to each other after the clutch 70 is connected. However, when handling torque is applied through the steering wheel 10, the rotation angle of the first rotating part 30 and the rotation angle of the second rotating part 40 may have different values from each other due to the torsion bar 54 installed in the first rotating part 30.

Therefore, the controller 60 may calculate the torque value by using the rotation angle of the first rotating part 30, the rotation angle of the second rotating part 40 and the torque constant of the torsion bar 54. Through the above-described method, the system may not enter the manual mode but maintain the normal mode, even when a torque value cannot be measured through the first sensor 52. Thus, the stability of the system can be improved.

In accordance with the embodiment of the present invention, even when the function of the first sensor 52 to sense a torque value fails, the controller 60 may calculate the torque value using the rotation angles measured by the first and second sensors 52 and 58 and the previously inputted torque constant of the torsion bar 54, and then operate the second driver 90, thereby improving the fail safe function. Furthermore, when the second driver 90 to move the gear bar 20 fails, the clutch 70 may synchronize the rotations of the first and second rotating parts 30 and 40 and switch the steer-by-wire apparatus 1 to the MDPS mode to move the gear bar 20, thereby improving the fail safe function.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A steer-by-wire apparatus comprising:
   a first rotating part configured to rotate with a steering wheel;
   a first driver connected to the first rotating part and configured to rotate the first rotating part or provide a steering reaction force to the first rotating part;
   a first sensor configured to measure at least one of a first rotation angle and a torque value of the first rotating part;
   a second rotating part separated from the first rotating part and engaged with a first rack gear provided on a side surface of a gear bar;
   a second driver connected to the gear bar and configured to move the gear bar;
   a second sensor configured to measure a second rotating angle of the second rotating part;
   a clutch connected between the first and second rotating parts; and
   a controller configured to, in response to detecting that the first sensor fails to measure the torque value of the first rotating part, control the clutch to synchronize rotations of the first and second rotating parts, calculate the torque value of the first rotating part based on the first and second measured rotation angles, and control the second driver based on the calculated torque value.

2. The steer-by-wire apparatus of claim 1, wherein the first driver comprises:
   a first worm wheel gear attached to the first rotating part and configured to rotate with the first rotating part; and
   a first motor having an output shaft engaged with the first worm wheel gear.

3. The steer-by-wire apparatus of claim 1, wherein the second driver comprises:
   a screw gear provided on the gear bar;
   a rotating nut configured to engage the crew gear;
   a second motor having an output shaft; and
   a belt member configured to connect the output shaft of the second motor to the rotating nut.

4. The steer-by-wire apparatus of claim 1, wherein:
   the gear box further comprises a second rack gear, and
   the second driver comprises:
      a driving pinion gear configured to engage and rotate with the second rack gear;
      a second worm wheel gear attached to the outer circumference of the driving pinion gear and configured to rotate with the driving pinion gear; and
      a second motor having an output shaft engaged with the second worm wheel gear.

5. The steer-by-wire apparatus of claim 4, further comprising a rotation sensing part facing the driving pinion gear and configured to measure a rotation angle of the driving pinion gear.

6. The steer-by-wire apparatus of claim 1, wherein:
   the first rotating part comprises first and second members, and
   the first sensor comprises:
      a torsion bar having both sides connected to the first and second members of the first rotating part; and
      a measurement member covering outsides of the first and second members and configured to measure a torque value of the torsion bar and rotation angles of the first and second members.

7. The steer-by-wire apparatus of claim 6, wherein the controller is configured to calculate the torque value further based on a torque constant of the torsion bar.

8. The steer-by-wire apparatus of claim 7, wherein the clutch comprises:
   a first clutch connected to the first rotating part; and
   a second clutch connected to the second rotating part and facing the first clutch.

* * * * *